(12) United States Patent
Bhattathiri et al.

(10) Patent No.: US 12,130,948 B2
(45) Date of Patent: Oct. 29, 2024

(54) SCREEN CAPTURE DATA PROTECTION FOR MANAGED DEVICES

(71) Applicant: VMWARE, INC., Palo Alto, CA (US)

(72) Inventors: Madhavan Kara Bhattathiri, Bangalore (IN); Sushma Shadakshari, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 138 days.

(21) Appl. No.: 17/896,277

(22) Filed: Aug. 26, 2022

(65) Prior Publication Data

US 2024/0005041 A1    Jan. 4, 2024

(30) Foreign Application Priority Data

Jun. 29, 2022    (IN) .............................. 202241037296

(51) Int. Cl.
*G06F 21/62*    (2013.01)
*G06F 21/55*    (2013.01)

(52) U.S. Cl.
CPC .......... *G06F 21/629* (2013.01); *G06F 21/554* (2013.01); *G06F 2221/032* (2013.01)

(58) Field of Classification Search
CPC . G06F 21/629; G06F 21/554; G06F 2221/032
See application file for complete search history.

(56) References Cited

U.S. PATENT DOCUMENTS

| | | | |
|---|---|---|---|
| 10,083,323 B1 * | 9/2018 | Patel | G06F 9/44536 |
| 10,467,408 B1 * | 11/2019 | Siev | G06F 21/56 |
| 2021/0294926 A1 * | 9/2021 | Duffy | G06F 21/84 |
| 2022/0391500 A1 * | 12/2022 | Chen Kaidi | G06F 21/552 |
| 2024/0086529 A1 * | 3/2024 | Rufino | G06F 21/554 |

* cited by examiner

*Primary Examiner* — Frantz B Jean
(74) *Attorney, Agent, or Firm* — Kim & Stewart LLP (57) ABSTRACT

Examples herein include methods for dynamically protecting selective content during screen capture on a user device that is running an iOS operating system. The method includes extending a UI class that includes a protected field of an iOS class. The custom class can receive configuration data and determine which elements to protect. The protected elements can be placed within the protected field whereas the non-protected elements can be kept outside of the protected field. The operating system can hide the protected field and its contents during screen capture, while allowing additional content outside the protected field to remain displayed.

20 Claims, 4 Drawing Sheets

SCREEN CAPTURE DATA PROTECTION FOR MANAGED DEVICES

RELATED APPLICATIONS

Benefit is claimed under 35 U.S.C. 119(a)-(d) to Foreign Application Serial No. 202241037296 filed in India entitled "SCREEN CAPTURE DATA PROTECTION FOR MANAGED DEVICES", on Jun. 29, 2022, by VMware, Inc., which is herein incorporated in its entirety by reference for all purposes.

BACKGROUND

Enterprises place much importance on the security of their data. Data loss prevention is a major focus of all unified endpoint management ("UEM") solutions. Many mobile platforms, such as iOS, ANDROID, macOS, and WINDOWS provide mechanisms for data loss prevention that can be managed by a UEM vendor. For example, mobile platforms can provide application programming interface ("API") or software development kit ("SDK") access to the data loss prevention features.

Screenshot prevention is one sought-after feature of data loss prevention. Some operating systems do not provide any API or SDK access to screenshot prevention features. For example, iOS does not provide any mechanism to control screenshots per application, and instead requires the restriction on the device for all applications as part of the UEM solution. This is problematic because every application on the device will be blocked from screen capture, rather than just the applications associated with the UEM solution. Because employees will not like this, it can lead to enterprises not incorporating screenshot restrictions as part of its data loss prevention solutions. Therefore, even though an application may be provisioned and managed as part of a UEM solution, data within that application can still be exposed to screenshots or screen recording.

There is also currently no way to disable certain portions of the application from being captured while other portions remain visible. For some applications, it can be advantageous to allow for the capture of non-critical content while preventing capture of confidential or sensitive information. There is likewise currently no way for a UEM administrator to decide which portions of content to block or allow for capture.

As a result, a need exists for new data protection systems for enterprise managed devices.

SUMMARY

Examples described herein include systems and methods for new data protection systems for enterprise managed devices. In particular, new methods are discussed for selective control of screen capturing for sensitive content within a graphical user interface ("GUI"). This can allow for preventing some content from being captured during a screen shot or screen recording, whereas other content may be allowed to persist in view on the GUI. The solution is dynamic, allowing for changes without redeploying the application. Additionally different protection levels can apply to different users or user devices.

In one example, the method includes wrapping or extending an operating system ("OS") class that is used to hide content during screen capture. Whereas these classes normally hide the entire GUI or simply a password, they can instead be extended such that a protected field is a subview and content is placed in the protected field. The placement inside or outside of the protected field can be based on configuration data that is received from a management server and available for changing on an administrative console. This can allow for selectively choosing which content will be hidden during screen capture or screen recording. The selections can be done anytime and the application can dynamically change what content gets screen captured without having to release additional versions of the application.

In one example, the GUI can display content within an outer-layer view class, which is a custom user interface ("UI") class. The custom UI class includes a protected field (e.g., of an iOS class) that can disable viewing during a screen capture. In this way, the iOS class can be a subclass of the UI class, and the content can be added to the subclass. For example, content such as a label, image, or video, and can be added as a subview of the protected field. This can take advantage of the OS's built-in features for preventing screen capture of the protected field (e.g., normally for passwords) while providing functionality at a higher layer that allows for individually using the OS feature for selective content, such as labels and images.

The custom UI class can determine whether the content should be protected based on configuration data received from a management server. This determination can occur as part of rendering the GUI screen, prior to screen capture in one example. For example, when content is added to the custom UI class, the UI class can compare the configuration data and profile information about the user or user device to determine whether the content should be protected. If so, the content can be added to the protected field that automatically is disabled (e.g., hides) during screen capture. If not, the content can be presented outside of the protected field.

In another example, the configuration data can include a first numeric value that indicates its confidentiality or sensitivity of the content. The user and/or user device can also have a second numeric value that indicates a trust level. This trust level can be stored in a user profile in one example. The first and second values can be compared to determine whether the content should be added to a protected field. For example, if the user's trust level meets or exceeds the confidentiality level of the content, then the content can be placed outside of the protected field. Otherwise, the content can be placed inside the protected field.

An application can have a default confidentiality of protected, unprotected, or some numeric confidentiality level. Then all the content can be rendered according to the default unless configuration data exists for the specific content, user, or user device. The configuration data can override the default, allowing for customized protection solutions for different content, users, and user devices.

When the screen capture occurs, the OS can disable display of the protected field, causing the content within the protected field to be hidden from display on the GUI during the screen capture. Any additional content outside of the protected field remains displayed for capture. With this approach, less-sensitive content can remain on the GUI during the screen capture while the sensitive content is hidden.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

For nearly all enterprises, data needs to be secure from different forms of loss. Examples below provide a mechanism for controlling and preventing the capture of screenshot and video recording within a specific application that is managed by the UEM. An administrator can decide which screens or elements on the screens in the application can be disabled or enabled for screen capture. In one example, an administrator can define policies that selectively enable content to be captured or recorded depending on the trust level of the user. For example, different things can be hidden or enabled during screen capture for entry level employees versus senior leadership teams.

The system can also dynamically adjust to values changed on the administrator console. In one example, the data loss prevention changes can take effect without requiring the application to be updated or published.

Figure 1:
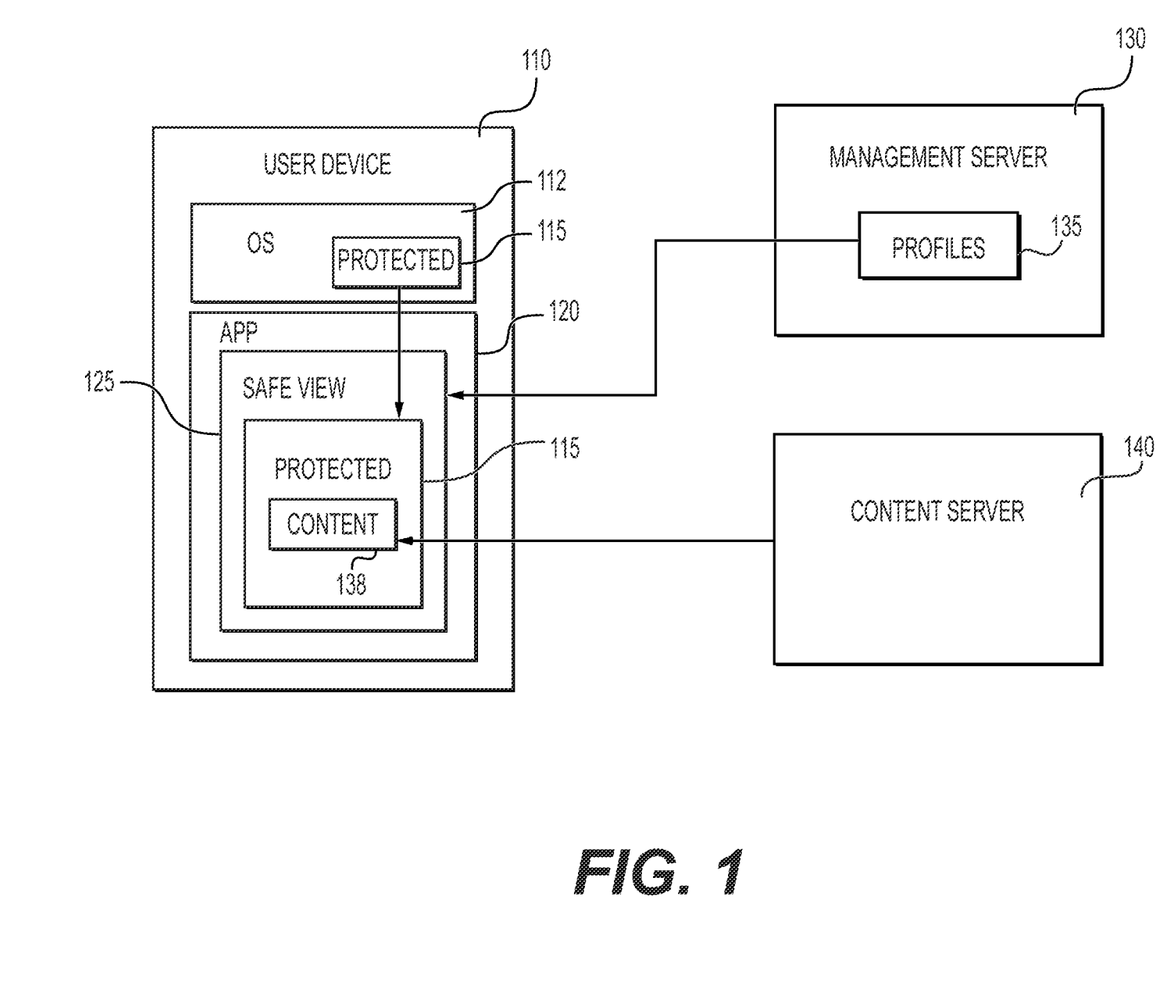
FIG. 1 is an illustration of an example system for data protection against screen sharing in enterprise devices.

FIG. 1 is an illustration of an example system for data protection against screen sharing and screen recording. Additional functionality for protecting data from screen capture can be incorporated in an SDK or API. These features can include blocking screen capture of individual pieces of content within an application, unlike the features available in APPLE operating systems, which globally block screen capture across all applications. Current UEM systems predominantly only alert a user or administrator after a screen capture has occurred, but do not prevent the screen capture in the first place. Examples herein instead prevent data exposure by disabling the screenshot or screen recording action for specific content, rather than just showing an alert or logging an action.

Currently, APPLE does not provide any mechanism to prevent screenshots on iOS applications. There is a notification fired after the screenshot is taken (i.e., UIApplication.userDidTakeScreenshotNotification), but nothing to prevent the screen shot from happening. However, text entered in a Password UITextfield is by default secured and is not captured when a screen capture is triggered. In some examples, the UITextfield can be used in a new way that prevents certain UI elements other than passwords from being captured. This can be done by extending and customizing OS classes that contain these protected fields.

In one example, an SDK extends a UI class provided by the OS 112. A protected field 115 that normally is used for passwords can be a subview that receives images or text. The SDK is incorporated into an application 120 that executes on a user device 110. The application 120 can be a managed application that is downloaded after enrolling in the UEM system. A user device 110 can be one of many such devices enrolled in the UEM system and communicate with a management server 130. The user device 110 can be any processor-enabled device, such as a phone, tablet, laptop, or personal computer. The management server 130 can be one or more physical servers that have at least one hardware-based processor. The management server 130 can control what content the user device 110 can access at the content server 140. The content server 140 can also be one or more physical servers that have at least one hardware-based processor. In one example, the management server 130 and content server 140 operate as part of the same physical server.

The user device 110 can execute an application 120 that utilizes the SDK. This application 120 can retrieve and display content from the content server 140. This can include displaying confidential enterprise documents or other types of content that are sensitive in nature. Many operating systems 112, such as iOS, do not provide a way to block selected content 138 within an application 120 while allowing other content 138 to display. Instead, iOS only blocks the entire application 120 and every other application during a screen shot if that feature is enabled. iOS provides a protected field 115 for passwords.

In one example, a custom UI class 125 called "safe view" can extend an iOS class with that protected field 115. Selected content 138 that needs to be disabled from capture can be loaded inside the protected field 115. In one example, the custom UI class 125 is part of an SDK and is a type of UI class. The custom UI class 125 can extend classes of the OS 112. For example, custom UI class 125 can provide an extension of iOS view classes and can contain additional logic for controlling a screen shot or screen recording actions. Screen shots and screen recording are discussed synonymously herein, and both are referred to as screen captures. The solution can include different classes for controlling screen shots versus screen recordings, or one class can handle both types of screen capture.

When the OS 112 detects a screen capture, the OS 112 can cause any content 138 within the protected field 115 to be disabled prior to actually capturing the GUI screen. This can be done by loading nothing in place of the content 138 during the screen capture. Alternatively, a mask can be added on top of the content 138 and remain so until the screen capture has ended.

The custom UI class 125 of the SDK can also allow administrators to dynamically control what content 138 is disabled for screen capture in application 120. The application 120 or another agent on the device 110 can also communicate with the management server 130. The management server 130 can be part of a UEM system and provide configuration data used by the application 120 to determine which content 138 to protect.

The management server 130 can store profiles 135. The profiles 135 are one type of configuration data used in deciding whether to activate and deactivate content 138 within the application 120. The profiles 135 can dictate what level of confidentiality content a user is allowed to screen capture. Different profiles 135 can apply to different users, different user groups, different user devices 110, and/or different device types. This can allow for different data loss prevention policies on a particular application 120 for executive type user versus entry level employees. The profiles 135 can also have geo-restrictions that give users different levels of enforcement depending on where the user is located.

The profiles 135 can also relate to applications 120 and particular content 138 types. An administrative console can allow an administrator to select screens or elements within screens that should be protected or not protected. In this way, the content 138 can have different levels of confidentiality as assigned by administrators. These levels can be numerous or can be a binary Boolean value. By comparing the allowed level of a user or user device 110 to the confidentiality level of content 138, the custom UI class 125 can determine which content 138 to deactivate and which should remain enabled during a screen capture event.

The custom UI class 125 can determine whether content 138 should be hidden as part of displaying the content on the GUI. Alternatively, this can happen later upon detection of a screen capture event. In either case, the custom UI class 125 can compare the confidentiality level of the content 138 to the allowed level of the user or the user device 110 associated with the profile 135. If the allowed level equals or exceeds the confidentiality level of the content 138, the content 138 can remain enabled during the screen capture. In one example, this is done by loading this safe content 138 outside of a protected field 115 of the OS 112. However, if the confidentiality level of the content 138 exceeds the allowed level of confidentiality for the profile 135 associated with the user device, the content 138 can be loaded within the protected field 115 of the OS 112.

This approach can allow for dynamic adjustment of data loss prevention within individual applications. For example, an administrator console can allow an administrator to change confidentiality levels of particular content 138, application 120 screens, or entire applications 120. The console can also allow the administrator to change user privileges. This information can be stored in the profiles 135 and deployed to an application 120 through the SDK. As a result, it is not necessary to release a new application 120 version to make the data loss prevention changes. The changes can instead be rolled out faster and with more specificity in terms of particular users, user groups, content 138, or content types. A console administrator can change a content type or content feature from enabled to disabled on the console, and the application 120 can behave accordingly based on the data it receives from the console during every launch or at time interval.

Once the application 120 is implemented with the custom UI views (such as the "safe view" class 125) provided by the SDK, the application 120 can later be dynamically controlled. The custom classes 125 along with content 138 on the screen can by default allow capturing of screenshot or recording just like a normal application. But once the application 120 is deployed and receives the SDK features from the console, the UI screens with custom views can be enabled and disabled for data loss prevention based on how those screens are configured via the UEM console.

As one example, from the UEM console an administrator can create a rule that prevents screen recording for the application 120. But later, the administrator can decide to enable a few UI elements to be allowed for screen recording. The application 120 that is in production will receive the updated profile 135 and act accordingly. No new application version is needed in that example.

Figure 2:
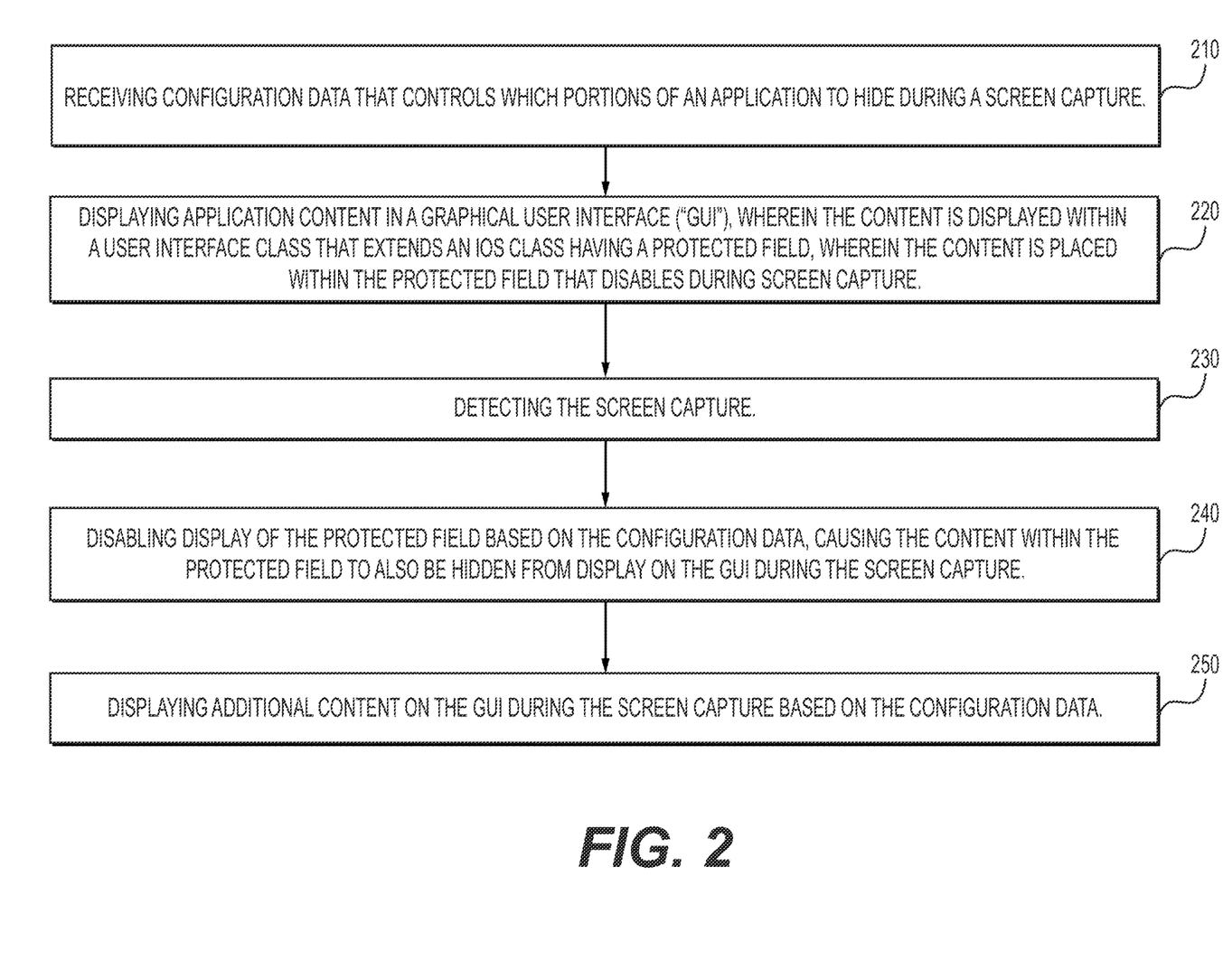
FIG. 2 is a flowchart of an example method for application analytics using an incident workflow interface.

FIG. 2 is a flowchart of an example method for application analytics using an incident workflow interface. At stage 210, the user device 110 can receive configuration data that controls which portions of an application 120 to hide during a screen capture. This configuration data can be part of a profile 135. The configuration data can specify which specific elements (e.g., content 138) to hide during screen capture in one example. Alternatively, the configuration data can specify which specific elements to enable during screen capture. In either case, the UI class 125 can place content 138 accordingly into the protected fields 115.

The configuration data can be set by an administrator using an administrator console. In one example, the console allows the administrator to visualize GUI screens of the application 120 and select content 138 to which a rule should apply. The content 138 can be selected as individual screen elements, entire GUI screens, or portions of screens. Different rules can also be created for video capture as opposed to a screen shot.

The configuration data can be saved as profiles 135 on the management server 130. Then, when application 120 loads or is executing on the user device 110, the SDK or an agent on the device 110 can receive the relevant profile 135 or changed portion as configuration data.

At stage 220, the GUI of the application 120 can display the content 138. The content can be rendered in a custom view provided by the custom UI class 125, which extends an iOS class having a protected field 115. The protected field 115 can disable during a screen capture. If the content is to be protected according to the configuration data, then the custom UI class 125 can place the content within the protected field 115. Therefore, the content 138 can display but also get the benefit of selectively disabling during a screen capture event according to the configuration data.

Different custom UI classes 125 can be invoked as part of rendering the content 138 depending on content type. For example, a first custom UI class 125 can display text whereas a second custom UI class 125 can display video. These custom classes 125 can have different functions for enabling and disabling the different content types.

For each screen or element that is implicated in the configuration data, the custom UI class 125 can determine whether the screen or element should be placed in a protected field 115. The determination can be based on a true or false Boolean value for the screen or content 138. Alternatively, the screen or individual elements can have different confidentiality values. These values can be compared against the user's or user device's 110 trust level, all of which can be part of the configuration data and profiles 135. If the trust of the user device 110 meets or exceeds the confidentiality level of the element, then the element can be rendered outside of the protected field 115.

The protected field 115 can be a text field normally used to secure a password, in an example. APPLE's iOS provides such fields. The custom UI class 125 can selectively use these protected fields 115 to create a dynamic data loss prevention solution for the application 120.

At stage 230, a screen capture event can be detected. This detection can be done by the OS 112. Some operating systems, such as iOS, do not provide any mechanism to prevent screenshots on iOS apps. There is a notification fired after the screenshot is taken (UIApplication.userDidTakeScreenshotNotification), but nothing to prevent it. However, iOS and similar operating systems 112 can automatically disable content that exists in the protected fields 115, depending on OS 112 functionality. By extending these view classes such that the protected field 115 is a subview that contains the content 138 that should be disabled, the OS will cause the field 115 contents to be disabled.

Alternatively, the OS 112 can send out a notice to the custom UI class 125 based on its extension of a UI class of the OS 112, in an example.

At stage 240, in an instance where the screen capture is detected, the OS 112 or application 120 can disable display of content 138 that resides in the protected field 115. Again, this can be based on the configuration data, which can dictate whether to place the content 138 in a protected field 115 when the screen is rendered. Disabling the protected field 115 can cause the content 138 within the protected field 115 to be hidden from display on the GUI during the screen capture.

Alternatively, the custom UI class 125 can receive the notice of screen capture from the OS 112 and take different measures to disable the content 138 implicated by the configuration data as protected. For example, when a video recording attempt is detected, the custom UI class 125 can add a mask over the protected content 138. This mask can include a custom message that is setup at the administrative console. For example, the mask can state "Video capture is disabled for this content."

At stage 250, the application 120 can allow additional content to remain enabled during the screen capture based on the configuration data. For example, there may be some content 138 that the administrator has set to remain eligible for screen capture. That is because not all content 138 in the application 120 is likely to be confidential. The administrator can designate particular screens or elements of those screens as enabled during screen capture. Alternatively, the custom UI class 125 can determine that for some elements or screens the confidentially level is lower than the trust level of the user or user device 110. The permissions can be different between video capture and screen snapshots.

When the screen capture is detected at stage 230, the custom UI class 125 or OS 112 can disable the protected fields 115. But content that was already deemed enabled can be loaded in the custom UI class 125 outside of the protected fields 115. This means that while the content 138 in the protected fields 115 gets hidden, additional content 138 outside of those fields 115 can remain enabled. In another example, the custom UI class 125 includes additional logic to determine which of the protected fields 115 to disable before the screen capture begins.

In either case, some of the additional content can remain enabled, as dictated by the configuration data set by the administrator. This can allow for dynamic and custom data loss prevent solutions that are less invasive to the user and do not require redeployment of the application to make security changes.

Figure 3:
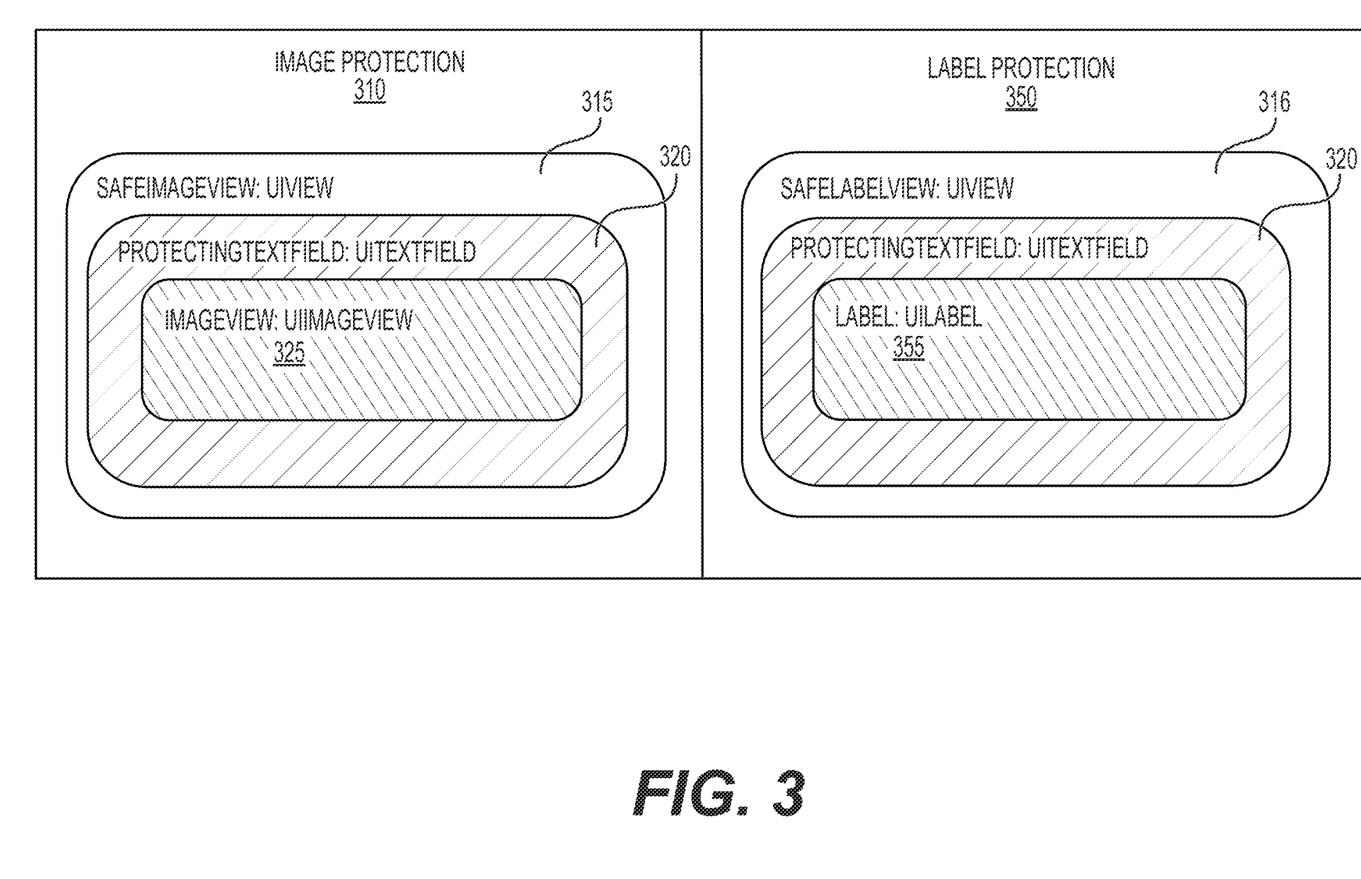
FIG. 3 is an illustration of an example class hierarchy for preventing screen capture of content that is displayed in a GUI.

FIG. 3 is an illustration of an example view of hierarchies for preventing screen capture of content 138 that is displayed in a GUI. Dimensional constraints of the views can be set such that the views are pinned to all sides of the GUI. As a result, the GUI can still look the same as it did without use of the custom UI classes of the SDK.

Two different view hierarchies 310, 350 are illustrated. The first hierarchy 310 relates to image protection whereas the second hierarchy 350 relates to label protection. Different custom UI classes 315, 316 can be included in an SDK for protecting different types of content 138. In this example, the different type are images and labels, respectively.

The two illustrated custom UI classes 316 and 315 have a label 355 and image property 325 in them, respectively. Both of the custom UI classes 315, 316 also have a protected text field 320 as a subview, which is not exposed on the GUI. The text field 320 subview can span the dimension of the screen. The label 355 and image 325 can be added as subviews to the protected text fields 320 and can appear on the GUI at the exact locations that they should. Based on the administrator's settings in the configuration data that is received from the management server 130, the custom views 315, 316 are dynamically protected.

To selectively protect an image or text, for example, the application 120 can use the properties of the UIImageView 325 and UILabel 355 classes. For example, the following call could be used to create an image within the first custom UI class 315: SafeImageView( ).imageView.image=someImage The protected text field 320 can be a UITextfield that is normally used for passwords in APPLE products. Text entered in the UITextfield is by default secured and is not captured by iOS when a screenshot is triggered. Taking advantage of this, the view hierarchies 310, 350 can extend the UIView and UITextfield to selectively add labels or images to the UITextfield for selectively disabling that content 138 during a screen capture. Based on the payload (i.e., configuration data) that is fetched from the management server 130, the application 120 and/or screens can dynamically decide whether to block the content 138 or simply leave it raw.

In further detail, the first custom UI class 315 can be used to render an image. In this example, the custom UI class 315 is called "SafeImageView." It can extend an iOS class, such as "UI View." This UI class 315 can include a protected field 115 that is part of the iOS class. In this case, the protected field 115 is a UITextfield 320 used by iOS, named "ProtectingTextField." This protected field 320 can be disabled during a screen capture event.

Inside of the protected field 320 is another nested class or variable for displaying an image. In this example, "imageView" 325 can be instantiated from the UIImageView class and can display an image. In one example, the image can be confidential content 138 that gets loaded inside the protected field 320. In a screen capture event, the protected field 320 can disable display of the image. However, if the configuration data does not indicate disabling the image during screen capture, the image can instead be created outside of the protected field 320. In a screen capture event, the image can remain active and displayed.

Alternatively, the custom UIView class 315 can load the image as part of imageView 325 but contain additional logic for determining whether to deactivate the protected field 320 when a screen capture is detected.

The second illustrated custom UI class 316 is called "SafeLabelView" and also extends the iOS UIView class. SafeLabelView 316 includes a protected field 320 with a label 355 inside the protected field 320. The label 316 can be an instance of the UILabel class and can be instantiated when content 138 is a text label that the configuration data indicates is confidential. This results in loading the text inside the protected field 320. In a screen capture event, the protected field 320 can disable display of the text. However, if the configuration data does not indicate disabling the text during screen capture, the text can instead be created outside of the protected field 320. In a screen capture event, the text can remain active and displayed.

Figure 4:
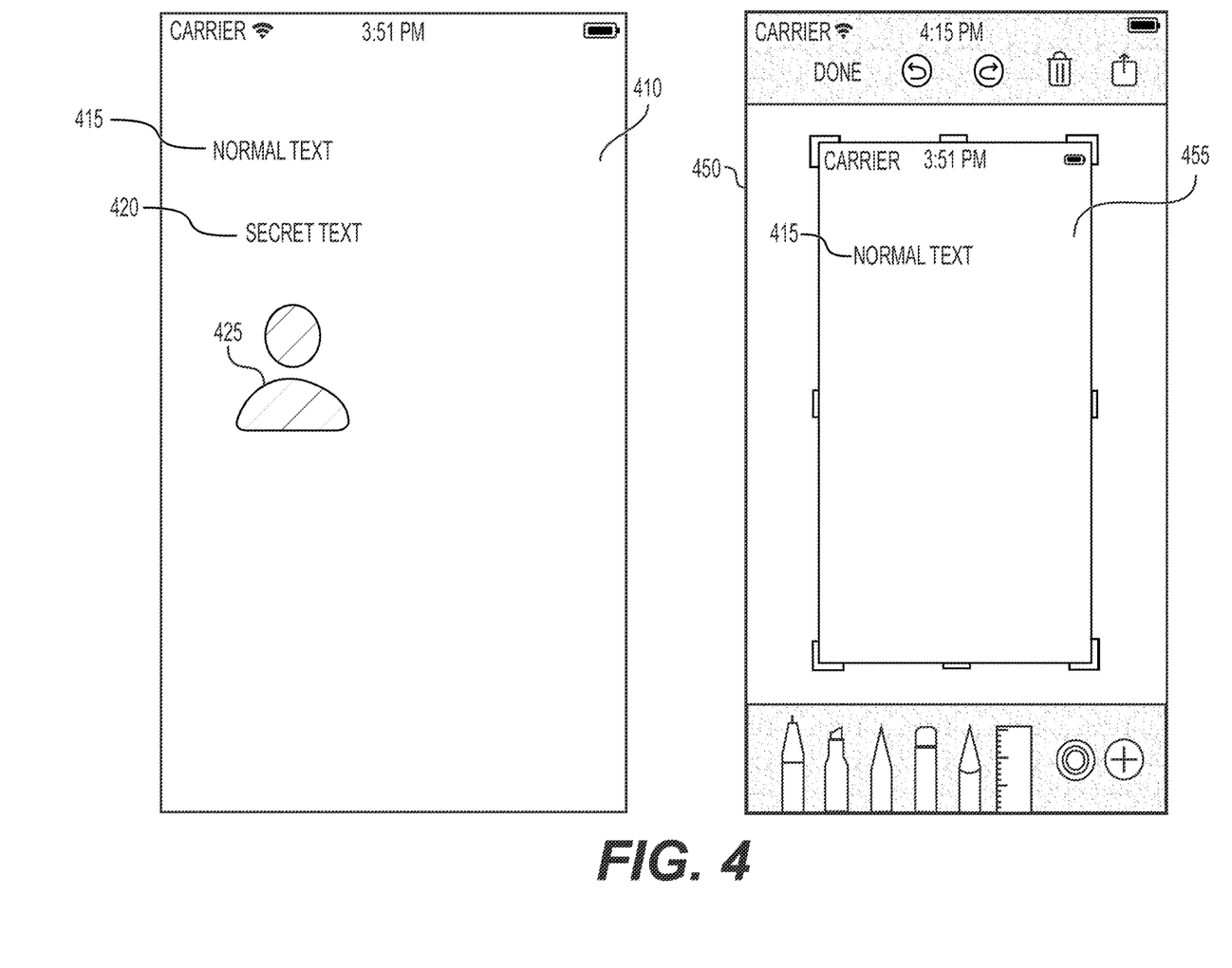
FIG. 4 is an illustration of example GUI screens for preventing screen capture of content that is displayed in a GUI.

FIG. 4 is an illustration of example GUI screens for preventing screen capture of content that is displayed in a GUI. GUI screen 410 includes multiple elements 415, 420, 425, each of which can be considered different content 138. The first element 415 is a normal text label. The normal text does not have any confidentiality. As such, the administrator can mark this element 415 as nonconfidential. Alternatively, everything the in application 120 can default to nonconfidential and the administrator can just decline to mark the first element 415 as confidential.

In either case, the custom UI class 316 of FIG. 3 can instantiate the UIlabel 355 outside of the protected field 320 so that it remains enabled during a screen capture. When a screen capture event occurs and the protected field 320 disables the content 138 within it, the normal text 415 outside of the protected field can still be visible.

The second element 420 is secret text. The secret text can be added to the label property 355 within the protected field 320 of custom UI class 316 if the configuration data indicates the secret text is confidential. For example, the secret text might include a "true" value for confidentiality. Alternatively, the configuration data can indicate the secret text has a confidentiality score of 3 in scale of 1 to 4. If the user trust level is a 1 or 2, then the secret text can be placed in the label property 355 within the protected field 320 of custom UI class 316. Otherwise, if the user trust level is a 3 or 4, the secret text can be outside of the protected field 320.

The protected text field 320 can be a UITextfield that is secured when a screenshot is captured. iOS and other operating systems 112 can disable the protected fields 115 automatically when a screen capture is attempted. Currently, APPLE does not provide any mechanism to prevent screenshots on iOS apps. There is a notification fired after the screenshot is taken (UIApplication.userDidTakeScreenshotNotification), but nothing to prevent it. But by leveraging the password UITextfield in a new way, content 138 within that field 115 can be protected.

The third element 425 is an image. If the configuration data indicates it is confidential, then the image can be secured similarly to the labels. This could instead involve using the UIView class 315 of FIG. 3, which includes a UIImageView property 325 within the protected field 320.

In the example of FIG. 4, the first element 415 is unprotected while the second and third elements 420, 425 are protected. As a result, when the OS detects a screen capture, screen 450 only contains the first element 415. The rest of the screen 450 shows as blank 455. This is because the second and third elements 420, 425 were placed within the protected field 320 but the first element 415 was not. In this example, once the label or image is protected, in a screen capture those elements 420, 425 will not appear and it instead looks as if nothing existed. Data is secured from screen capture.

In another example, the custom UI class 125 can receive a notice of the screen capture from the OS 112. For example, APPLE may fire a notification (e.g., UIApplication.userDidTakeScreenshotNotification) after the screen shot is taken. In response, the custom UI class 125 can track which elements were within a protected field 115 and can place a message on the screen at the location of one or more of those elements. This can ensure that the user realizes that the screen capture was partially disabled.

If the user believes additional material should be available for screen capture, they can contact an administrator. Using the console, the administrator can make any needed changes to which content 138 is protected. The changes can be received as configuration data at the user device 110. As a result, the next time the screen renders, some of the elements may be kept in a raw form rather than being placed in a protected field 115. This will allow those elements to remain on screen during screen capture.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for screen capture security in iOS, comprising:
   receiving configuration data that indicates which portions of an application to hide during a screen capture;
   displaying application content in a graphical user interface ("GUI"), wherein the content is displayed within a user interface ("UI") class that extends an iOS class having a protected field that disables during a screen capture, and wherein the content is placed within the protected field; and
   in an instance where the screen capture is detected, disabling display of the protected field based on the configuration data, causing the content within the protected field to be hidden from display on the GUI during the screen capture,
   wherein display of additional content remains enabled during the screen capture based on the configuration data.

2. The method of claim 1, further comprising:
   determining whether to protect the content from screen capture prior to rendering the content on the GUI, wherein the content is placed in the protected field based on the determination.

3. The method of claim 1, wherein the additional content is placed outside of the protected field when rendered on the GUI, and wherein the placement is based on determining that the additional content does not require protection from the screen capture.

4. The method of claim 1, wherein the UI class compares a confidentiality value of the content to a trust value of a user or user device to determine whether to place the additional content outside of the protected field.

5. The method of claim 1, further comprising displaying text in place of the protected content during the screen capture.

6. The method of claim 1, wherein the UI class is a first UI class used to protect a label and a second UI class is used to protect an image, and wherein both of the first and second UI classes include a protected field as a subview, wherein the first UI class places the label within the protected field and the second UI class places the image within the protected field.

7. The method of claim 1, wherein the protected field is automatically disabled by iOS based on the screen capture being detected.

8. A non-transitory, computer-readable medium containing instructions that, when executed by a hardware-based processor, cause the processor to perform stages for screen capture security in iOS, the stages comprising:
   receiving configuration data that indicates which portions of an application to hide during a screen capture;
   displaying application content in a graphical user interface ("GUI"), wherein the content is displayed within a user interface ("UI") class that extends an iOS class having a protected field that disables during a screen capture, and wherein the content is placed within the protected field; and in an instance where the screen capture is detected, disabling display of the protected field based on the configuration data, causing the content within the protected field to be hidden from display on the GUI during the screen capture, wherein display of additional content remains enabled during the screen capture based on the configuration data.

9. The non-transitory, computer-readable medium of claim 8, the stages further comprising:

determining whether to protect the content from screen capture prior to rendering the content on the GUI, wherein the content is placed in the protected field based on the determination.

10. The non-transitory, computer-readable medium of claim 8, wherein the additional content is placed outside of the protected field when rendered on the GUI, and wherein the placement is based on determining that the additional content does not require protection from the screen capture.

11. The non-transitory, computer-readable medium of claim 8, wherein the UI class compares a confidentiality value of the content to a trust value of a user or user device to determine whether to place the additional content outside of the protected field.

12. The non-transitory, computer-readable medium of claim 8, the stages further comprising displaying text in place of the protected content during the screen capture.

13. The non-transitory, computer-readable medium of claim 8, wherein the UI class is a first UI class used to protect a label and a second UI class is used to protect an image, and wherein both of the first and second UI classes include a protected field as a subview, wherein the first UI class places the label within the protected field and the second UI class places the image within the protected field.

14. The non-transitory, computer-readable medium of claim 8, wherein the protected field is automatically disabled by iOS based on the screen capture being detected.

15. A system for screen capture security in iOS, comprising:

a memory storage including a non-transitory, computer-readable medium comprising instructions; and a hardware-based processor that executes the instructions to carry out stages comprising:

receiving configuration data that indicates which portions of an application to hide during a screen capture;

displaying application content in a graphical user interface ("GUI"), wherein the content is displayed within a user interface ("UI") class that extends an iOS class having a protected field that disables during a screen capture, and wherein the content is placed within the protected field; and in an instance where the screen capture is detected, disabling display of the protected field based on the configuration data, causing the content within the protected field to be hidden from display on the GUI during the screen capture, wherein display of additional content remains enabled during the screen capture based on the configuration data.

16. The system of claim 15, the stages further comprising:

determining whether to protect the content from screen capture prior to rendering the content on the GUI, wherein the content is placed in the protected field based on the determination.

17. The system of claim 15, wherein the additional content is placed outside of the protected field when rendered on the GUI, and wherein the placement is based on determining that the additional content does not require protection from the screen capture.

18. The system of claim 15, wherein the UI class compares a confidentiality value of the content to a trust value of a user or user device to determine whether to place the additional content outside of the protected field.

19. The system of claim 15, the stages further comprising displaying text in place of the protected content during the screen capture.

20. The system of claim 15, wherein the UI class is a first UI class used to protect a label and a second UI class is used to protect an image, and wherein both of the first and second UI classes include a protected field as a subview, wherein the first UI class places the label within the protected field and the second UI class places the image within the protected field.

* * * * *